(12) United States Patent
Gnauck et al.

(10) Patent No.: US 6,959,154 B1
(45) Date of Patent: Oct. 25, 2005

(54) DIVERSITY RECEIVER FOR MITIGATING THE EFFECTS OF FIBER DISPERSION BY SEPARATE DETECTION OF THE TWO TRANSMITTED SIDEBANDS

(75) Inventors: Alan H. Gnauck, Middletown, NJ (US); Cedric F. Lam, Middletown, NJ (US); Sheryl L. Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 560 days.

(21) Appl. No.: 09/722,646

(22) Filed: Nov. 28, 2000

(51) Int. Cl.[7] .................. H04B 10/00; H04B 10/06; H04B 10/08; H04B 17/00
(52) U.S. Cl. .................. 398/159; 398/202; 398/208; 398/209; 398/27
(58) Field of Search .................. 398/147, 148, 398/149, 159, 160, 186, 187, 188, 189, 192, 398/210, 214, 202–206, 208, 27–29, 65, 398/76, 152; 455/46; 329/356; 332/167

(56) References Cited

U.S. PATENT DOCUMENTS

| | | | | |
|---|---|---|---|---|
| 3,665,443 | A * | 5/1972 | Galvin | 367/94 |
| 5,162,937 | A * | 11/1992 | Heidemann et al. | 398/79 |
| 5,245,347 | A * | 9/1993 | Bonta et al. | 342/149 |
| 5,298,962 | A * | 3/1994 | Nourrcier | 356/5.09 |
| 5,377,035 | A | 12/1994 | Wang et al. | |
| 5,522,004 | A * | 5/1996 | Djupsjobacka et al. | 385/123 |
| 5,739,866 | A * | 4/1998 | Kim et al. | 348/473 |
| 5,793,511 | A | 8/1998 | Buelow et al. | |
| 6,040,932 | A * | 3/2000 | Duck et al. | 398/1 |
| 6,072,616 | A | 6/2000 | Cohen et al. | |
| 6,115,162 | A | 9/2000 | Graves et al. | |
| 6,337,756 | B1 * | 1/2002 | Djupsjobacka | 398/183 |
| 6,359,716 | B1 * | 3/2002 | Taylor | 398/212 |
| 6,559,988 | B1 * | 5/2003 | Nielsen et al. | 398/82 |
| 2001/0050926 | A1 * | 12/2001 | Kumar | 370/529 |

FOREIGN PATENT DOCUMENTS

| | | | |
|---|---|---|---|
| DE | 4415176 A | 11/1994 | |
| EP | 0409260 A2 | 1/1991 | |
| EP | 409260 A2 * | 1/1991 | H04B 10/14 |
| JP | HEI 4-206766 | 2/1994 | |
| JP | HEI 10-259009 | 3/2000 | |

OTHER PUBLICATIONS

Japanese Patent No. 405153052—machine translation from http://www.ipdl.jpo.go.jp/homepg_e.ipdl.*

"Tunable RF-power-fading compensation of multiple-channel double-sideband SCM transmission using a nonlinearly chirped FBG"; Sun et al.; Photonics Technology Letters, IEEE, vol. 12, Issue 5, May 2000, pp. 546-548.*

(Continued)

Primary Examiner—M. R. Sedighian
Assistant Examiner—Nathan Curs

(57) ABSTRACT

Link robustness, chromatic dispersion and polarization mode dispersion (PMD) immunity can be improved in fiber optical system by using a method for receiving an optical double sideband signal over an optical fiber system, comprising the steps of splitting the received optical double sideband signal into an upper sideband signal and a lower sideband signal, photodetecting the upper sideband and the lower sideband, equalizing the photodetected upper sideband signal and the lower sideband signal, and combining the equalized upper sideband signal with the equalized lower sideband signal. While PMD compensation is envisioned as a major application, one may also use the method and system for chromatic dispersion compesation or dispersion slope compensation in high bit rate systems, i.e. using dispersion compensation fiber (DCF) for coarse compensation and diversity receiver with electrical equalizer for fine tuning.

26 Claims, 6 Drawing Sheets

OTHER PUBLICATIONS

H. Bülow, et al., "Adaptive PMD Mitigation at 10 Gbit/s using an Electronic SiGe Equaliser IC," ECOC '99, Sep. 26-30, 1999, pp. 138-139.

L.M. Lunardi, et al., "Performance Monitoring for Transparent Optical Networks," AT&T Labs—Research.

M. Fregolent, et al., "Adaptive Optical Receiver for Performance Monitoring and Electronic Mitigation of Transmission Impairments," ECOC 2000 Paper 2.1.2., Sep. 4, 2000.

S.L. Woodward, et al., "PMD Mitigation via Single-Sideband Modulation and Principal-State Launch," AT&T Labs—Research.

Communication and European Search Report, dated Oct. 5, 2002, from European Patent Application No. 01127367.9, four pages.

* cited by examiner

DIVERSITY RECEIVER FOR MITIGATING THE EFFECTS OF FIBER DISPERSION BY SEPARATE DETECTION OF THE TWO TRANSMITTED SIDEBANDS

FIELD OF THE INVENTION

The invention relates generally to optical communications and particularly to a method and apparatus for improving link robustness by independently receiving and equalizing the two sidebands in a double sideband transmission system.

BACKGROUND OF THE INVENTION

There is a great deal of legacy fiber with high polarization mode dispersion (PMD) in the field. In fact, PMD is becoming a limiting factor for transmission systems with speeds of 10 Gbps or above, especially in systems using old fibers with high birefringence. There has been significant customer demand for 10 Gbps private lines. Without PMD compensation, many of these fibers may not support 10 Gbps wavelength channels. Also, the current trend in bit rates of optical communication systems is quickly moving towards 10 Gbps and 40 Gbps per wavelength channel, because it is easier to manage one single channel of high bit rate than many smaller channels of equivalent aggregate bit rate. To preserve legacy systems and thus reduce infrastructure replacement expenses, thereby meeting consumer demand at the lowest possible cost, it is important for the industry to be able to provide customers with what they want (a.k.a. 10 Gbps or above) on already installed (legacy) embedded fibers.

Research in the area of PMD mitigation has centered around adaptive cancelation and tunable PMD compensation techniques such as delaying one polarization mode with respect to the other. Compensation can be accomplished in either the electrical or optical domains. Both electronic and optical equalizers have been demonstrated in the laboratory. (See, for example, H. Bulow, et al., "Adaptive PMD mitigation at 10 Gbps using an electronic SiGe equalizer IC", ECOC '99 paper II-138; and R. Noe, D. Sandel, M. Yoshida-Dierolf, S. Hinz, et al., Journal of Lightwave Technology, Vol. 17, p. 1602, September 1999.) PMD mitigation via single sideband modulation and principal-state launch has been proposed in METHOD AND SYSTEM FOR SINGLE-SIDEBAND OPTICAL SIGNAL GENERATION AND TRANSMISSION, U.S. application Ser. No. 09/477,816 filed Jan. 5, 2000 and commonly held and incorporated herein by reference. The present invention pertains to a diversity receiver for use in fiber optic systems.

SUMMARY OF THE INVENTION

In a typical optical transmission system, the optical carrier (usually generated by a laser source) is intensity modulated with the data signal, which could be a directly on-off keyed (OOK) signal representing binary digits or subcarriers as found in hybrid fiber coax (HFC) systems. Direct intensity modulation of the optical carrier results in a double sideband signal transmitted in the optical fiber with both upper and lower sidebands being received at the far end, unless suppressed. One of the sidebands is at an optical frequency above the optical carrier and the other sideband is at an optical frequency below the carrier. The two sidebands contain duplicated modulating information. Typically, only one of the sidebands is required to recover the transmitted data.

In an optical fiber communication system, the signal will suffer dispersion as it travels along the transmission fiber. Dispersion causes smearing of the transmitted signal in the time domain and degrades the system performance. The degradation due to dispersion increases with the signal bandwidth. In long distance transmission systems, dispersion can also interact with non-linearities in the optical fiber to further impair transmission. Moreover, because the two sidebands mirror each other about the optical carrier frequency, chromatic dispersion causes opposite phase changes in the two sidebands when the signal is converted back into the electrical domain. This spectrum folding effect makes electrical dispersion compensation of a double sideband modulated signal impossible. Since the two sidebands contain duplicated information, one way to mitigate the effect of dispersion is to suppress the transmission of one of the sidebands to reduce the signal bandwidth, which has been proposed by others.

Dispersion compensating fiber (DCF) with opposite dispersion has been used in optical communication systems to compensate for chromatic dispersion. However, PMD is also associated with fiber. While chromatic dispersion is deterministic and can be compensated with DCF, PMD is a statistical effect, which cannot be compensated simply by using DCF. Even for chromatic dispersion compensation, electrical compensation may be more flexible and compact.

Light signals in an optical fiber actually travel in two planes at right angles, or orthogonally, to each other with each axis representing a polarization mode. Typically, one thinks of the two axes being the x-axis and the y-axis. In a perfect optical system, light in each polarization mode travels down the fiber at the same speed. Due to impurities, strains and imperfect symmetry in actual fibers, the polarization modes travel through the fiber at different speeds, causing relative delay. That is, the two polarization modes arrive at different times, which degrades the performance. The result of dispersion is to limit the transmission distance or the bandwidth that a fiber may provide. The greater the signal frequency spectral width the higher the penalty.

PMD is statistical in that the causes of PMD are not predictable and PMD varies over time. Fibers inherently contain some amount of anisotropy owing to an accidental loss of circular symmetry during fabrication. This loss occurs either through a non-circular waveguide geometry or a non-symmetrical stress field in the glass. In either case, the loss of circular symmetry gives rise to two distinct polarization modes with distinct phase and group velocities. For example, if the core or a section of core is non-circular, for example, oval, then one of the polarization modes becomes slower than the other.

Additionally, the necessarily different chemical composition of the core relative to the cladding in a single-mode fiber usually results in slightly different thermal expansion coefficient for the two regions. This variation gives rise to radially-directed stresses when the fiber is cooled after being drawn during fabrication. These stresses depend on the temperature of the fiber.

Birefringence can also be created in a fiber when it is subjected to external forces in handling or cabling, such as bending, microbending or twisting of the fiber, however slight. This again would lead to a change in the refractive index of one of the polarization modes, causing one mode to be slower than the other.

The differential phase velocity induced by the birefringence can limit the bandwidth of a fiber by broadening pulses. The PMD is the differential group velocity that is defined by a group-delay time per unit length between the two modes. As explained above, the transmission properties of the optical fibers typically vary with ambient temperature. In practice, this manifests as a random, time-dependent drifting of the state of polarization at the output of a fiber or, in the case of PMD, as random time-dependent fluctuations in the bandwidth of the fiber.

However, digital lightwave systems rely on undistorted transmission of optical pulses through expansive lengths of fibers. Dispersive effects such as PMD can cause pulse spreading and distortion, thus, leading to system penalties. Because PMD is a time varying, stochastic effect, the system penalties are also time varying. For further details on the polarization effects in lightwave systems, see Poole, Craig D., et al., *Optical Fiber Telecommunications,* 1997, Volume IIIA, chapter 6, pages 114–161, hereby incorporated by reference in its entirety.

FIG. 1 depicts two fiber optical cables. The cable to the left shows no relative delay but the cable on the right shows a relative delay in one of the polarization modes. In each case, fiber 1 has two modes. In the case of the fiber on the left, polarization mode 3 and polarization mode 5 show no delay due to dispersion. On the fiber on the right polarization mode 9 can be denominated the slow axis mode and polarization mode 7 can be denominated the fast axis mode. FIG. 2 depicts the same delay as the cable on the right side of FIG. 1 but shows what a dispersed optical signal looks like. Slow axis 9 and fast axis 7 on FIG. 2 combine to show a dispersed optical signal 11. The measure of the difference between the slow and fast axis is indicated by 13.

Optical single sideband (OSSB) transmission schemes have been previously proposed and demonstrated to mitigate the effects of PMD and improve optical spectral efficiency. This idea has been described in a previously filed patent application Ser. No. 09/625,791, filed Jul. 26, 2000, entitled METHOD AND SYSTEM FOR REDUCING POLARIZATION MODE DISPERSION USING SINGLE-SIDEBAND DATA GENERATION AND TRANSMISSION, commonly held and incorporated herein by reference. In the present invention, both sidebands in a double sideband transmitted signal are transmitted, but the two sidebands are detected separately and a diversity-combining receiver is used to improve the link robustness, especially for PMD immunity.

It is therefore an object of the present invention to improve link robustness by transmitting both sidebands of an amplitude modulated optical carrier.

It is a further object of the present invention to improve PMD immunity.

It is yet another object of the present invention to detect both sidebands separately and use a diversity combiner to combine the separately detected and equalized signals.

BRIEF DESCRIPTION OF THE DRAWINGS

The present invention will now be described in greater detail with reference to the preferred embodiments of the invention, given only by way of example, and illustrated in the accompanying drawings, in which same elements are numbered the same to the extent possible.

DETAILED DESCRIPTION OF THE PREFERRED EMBODIMENTS

In a diversity receiver, which separately detects the two sidebands on an amplitude modulated optical carrier, the duplicated information in the two sidebands suffers different impairments during transmission. By selectively combining the recovered information from the two sidebands, one can achieve a better immunity against fiber dispersion impairments such as chromatic and polarization mode dispersions.

Figure 1:
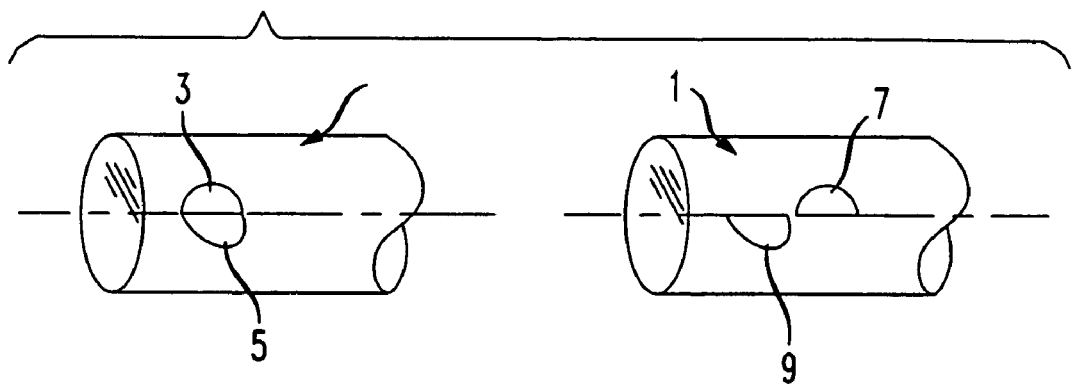
FIG. 1 depicts two fiber cables, one without relative delay due to poarization mode dispersion and one with relative delay caused by polarization mode dispersion.
Figure 2:
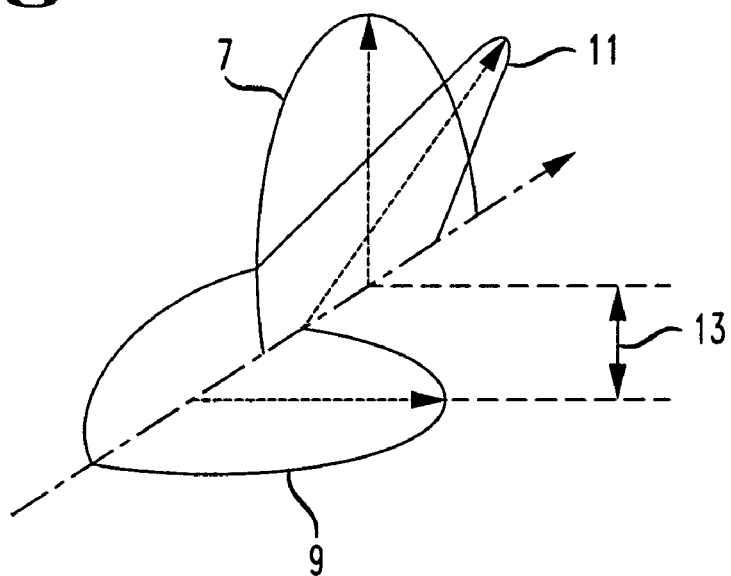
FIG. 2 shows two polarization modes, one on the fast axis and one on the slow axis and the resulting dispersed signal.
Figure 3:
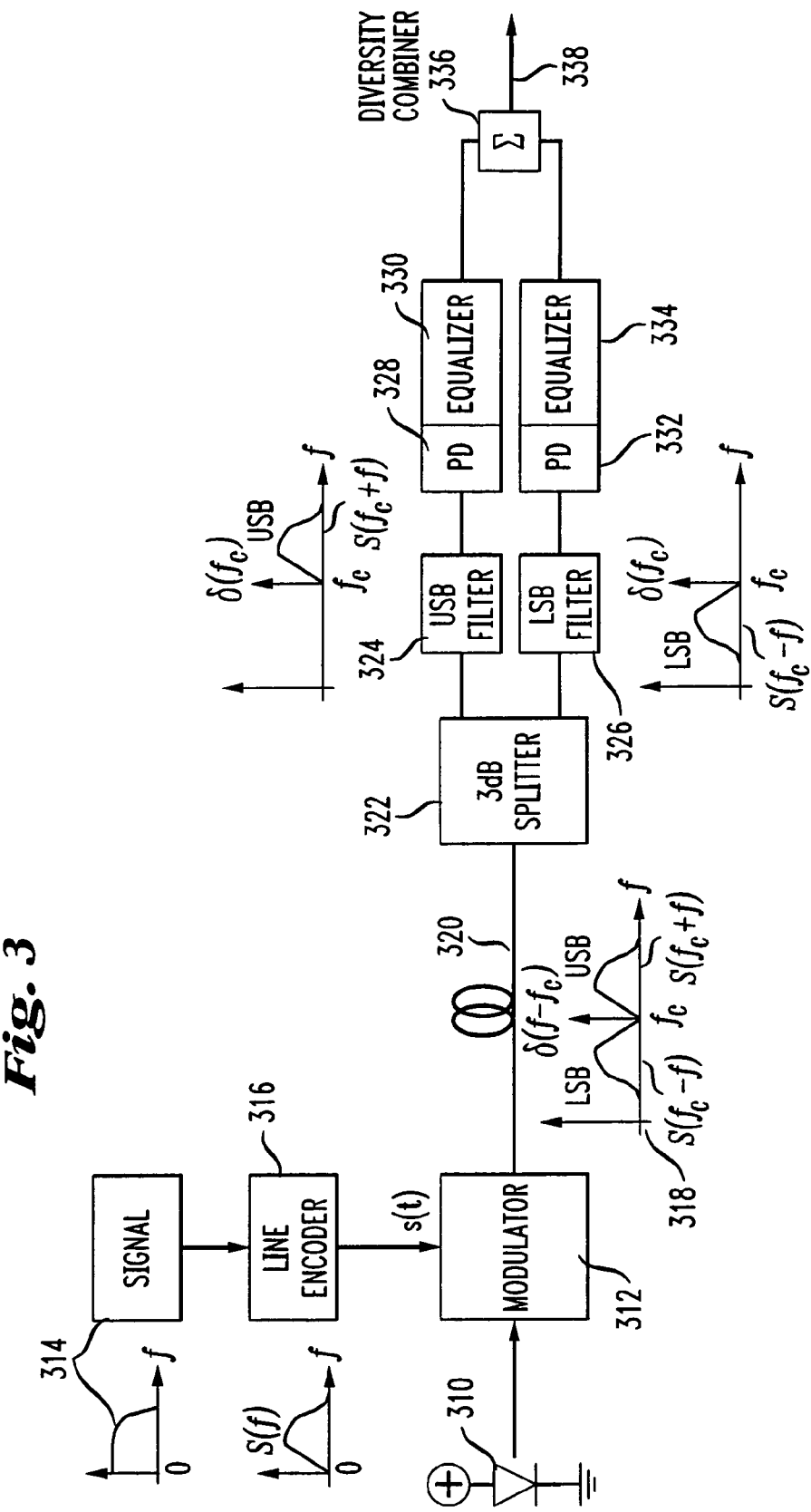
FIG. 3 depicts both the transmission and reception of both sidebands of an optical signal according to the present invention.

The present invention is illustrated in FIG. 3. The signal to be transmitted is optionally fed into a line encoder, which then amplitude modulates the optical carrier using a modulator. Both sidebands of the amplitude modulated signal are then transmitted over the optical fiber. The received signal is split into its two sidebands using an optical diplexing filter. In a manner analogous to an RF diplexor, the optical diplexing filter separates an input optical signal into two output signals, with different optical frequencies being routed to different output ports. FIG. 3 shows an optical diplexing filter, which uses a 3 dB splitter 322 in combination with optical filters 324 and 326. The received signal is split using the optical diplexing filter into upper and lower sidebands. Each of the signals is then photodetected and equalized separately. The signals resulting from the photodetection and the equalization are then combined using a diversity combiner, which can select the better of the two signals or sum the signals or combine the signals using a weighed sum of the signals. In the latter two embodiments the individual signals may be delayed or equalized prior to being combined. Adaptive techniques such as adaptive tapped delay line filters can operate on the individual signals and be used to optimize the quality of the combined signal. The diversity combiner is adaptive in that the choice of combination is based on the real time link properties. It is also an option to filter both the upper sideband signal and the lower sideband signals prior to photodetection.

There are many ways to measure the channel properties/link quality. In a SONET system, overhead bytes are used to monitor the channel bit error rate. A performance monitoring scheme for each sideband using a technique called quasi bit error rate (QBER) is proposed as a preferred embodiment of the present invention. This technique, described in "Performance Monitoring for Transparent Optical Networks" by L. M. Lunardi, M. D. Feuer and M. A. Thomas, presented and published in the Proceedings of the 26th European Conference on Optical Communication, Sep. 3–7, 2000, in Munich, Germany, and incorporated herein by reference, can be implemented in circuit and is format independent as long as the data is on-off keyed.

Depending on the channel quality estimation, e.g., using QBER measurement, one can either choose the output from the better channel to determine the received bit. Alternatively, one can also use a weighted sum of the detected signal from each sideband, the weighting coefficient will be determined by the channel quality measurement. The received bit will be determined by the weighted sum of the received signal from the two branches.

Figure 6:
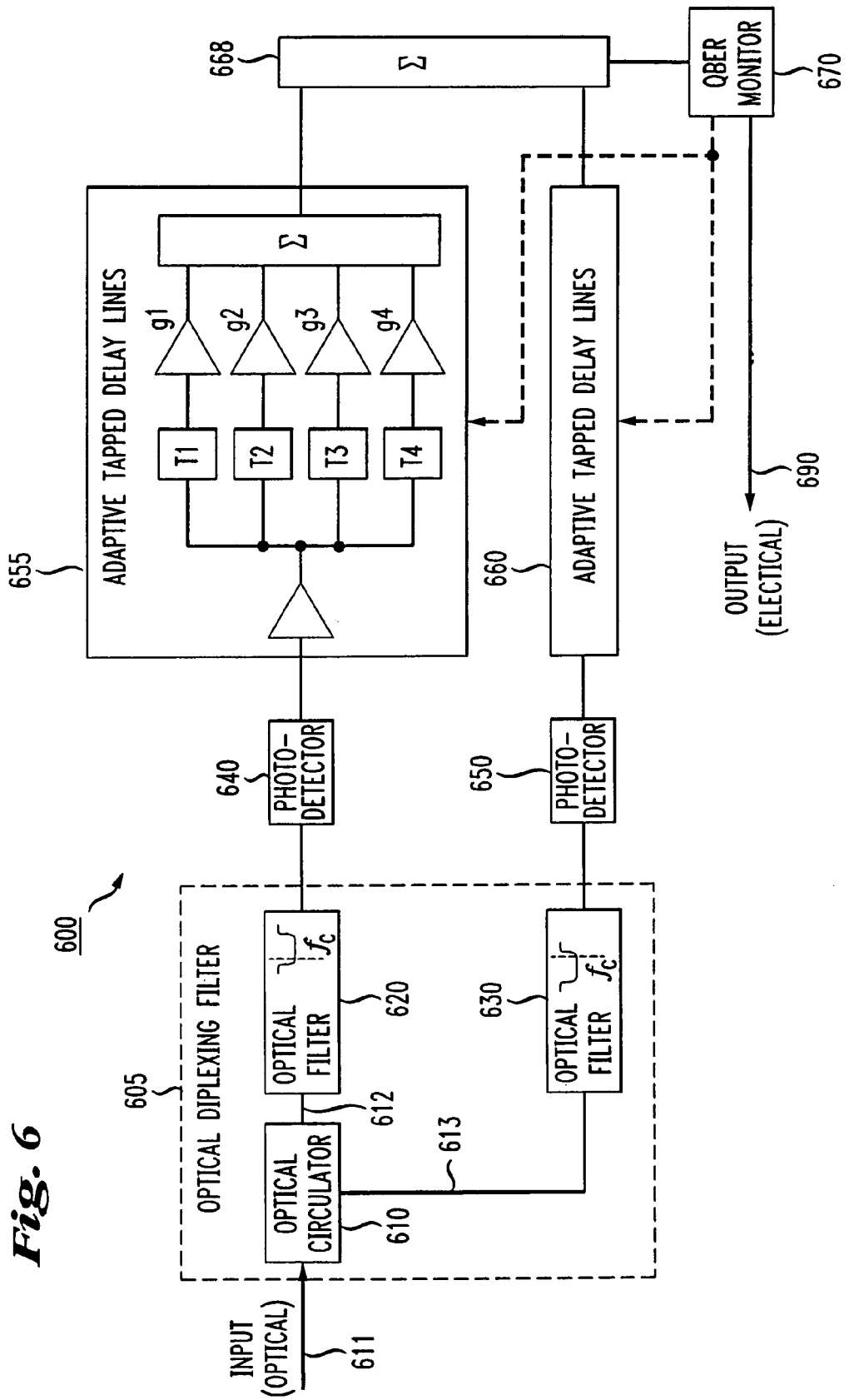
FIG. 6 shows the block diagram of a diversity receiver for dispersion compensating each side band using adaptive tapped delay line equalizers.

An alternative embodiment of the invention, including a different optical diplexing filter and a more complex diversity combiner, is shown in FIG. 6. The optical single sideband diversity receiver 600 receives a double sideband signal from optical input 611. This light is input to port 611 of optical circulator 610. The circulator 610 routes light input from port 611 to port 612. A fiber Bragg grating reflects light in one sideband (FIG. 6 depicts a filter which would reflect the higher frequency sideband), and transmits the light in the other sideband. The light transmitted through optical filter 620 is detected at photodetector 640. The reflected light reenters circulator 610, which routes light for port 612 to port 613. A fiber Bragg grating with a different center frequency reflects the light in one sideband (FIG. 6 shows the lower frequency sideband being reflected). Optical filter 630 is optional. Though fiber Bragg grating filters are shown in this figure, other optical filters, such as thin film filters, could also be used. The light transmitted through optical filter 630 is detected by photodetector 650. Optical diplexing filter 605 comprises optical circulator 610. optical filters 620 and 630 and ports 612 and 613. The electric signals output from photodetectors 640 and 650 are sent to adaptive equalizers 655 and 660. These adaptive equalizers can be made of variable gain amplifiers and variable delay filters, as shown in 655. The signals are combined in summation circuit 668, and sent to a QBER monitor 670. The signal from the QBER is sent to a microprocessor, which adjusts the adaptive equalizer to optimize the quality of the received signal. A QBER in combination with an equalizer and microprocessor has been previously demonstrated (M. Fregolent, et al., "Adaptive Optical Receiver for Performance Monitoring and Electronic Mitigation of Transmission Impairments", Paper 2.1.2, Proceedings of 26$^{th}$ European Conference on Optical Communications, Sep. 3–7, 2000, Munich, Germany), but that demonstration did not use a single sideband diversity receiver. The received signal is then output from the QBER at 690.

Figure 7:
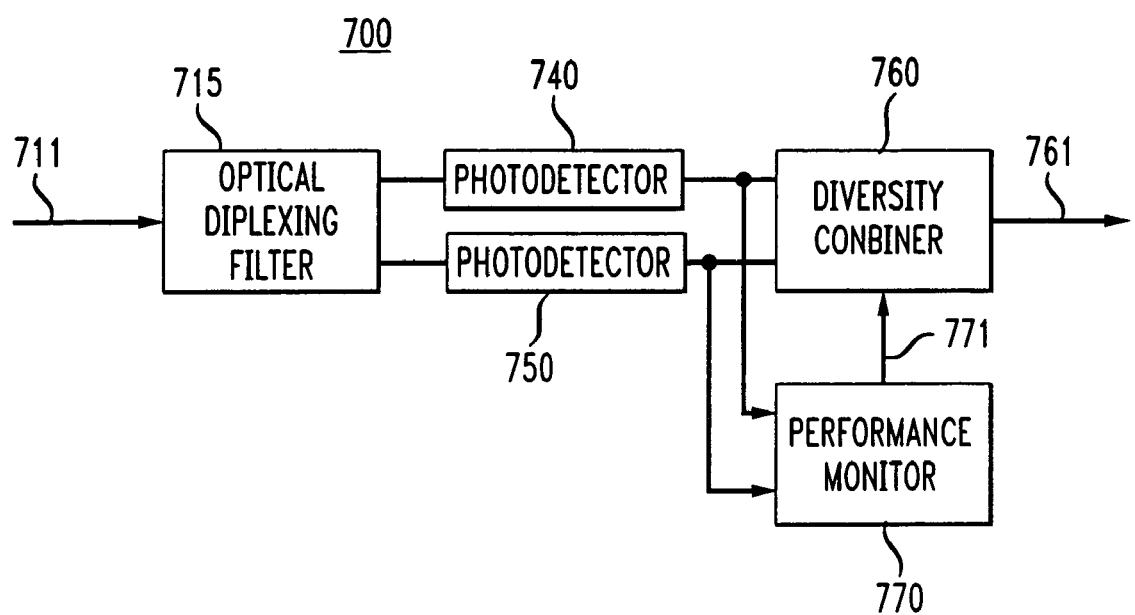
FIG. 7 shows the block diagram of a diversity receiver with a performance monitor for selecting the single-sideband signal with superior signal quality.

Another embodiment of the invention, including a diversity combiner and a performance monitor, is shown in FIG. 7. The optical single sideband diversity receiver 700 receives a double sideband signal from optical input 711 of optical diplexing filter 715. Optical diplexing filter 715 transmits the upper and lower sideband signals to photodetectors 740 and 750. Photodetectors 740 and 750 are connected to both diversity combiner 760 and performance monitor 770. Performance monitor 770 determines which signal has the superior quality, and sends a control signal 771 to diversity combiner 760. Diversity combiner 760 selects one of the two input signals and sends that signal to output port 761.

The transmitter looks the same as the transmitter in any other optical transmission system. In order to facilitate the separation of the two sidebands at the receiver, it is possible to use a line encoder in an on-off keyed system to separate the optical carrier from the low-frequency content of the sidebands as shown in FIG. 3. A line encoder has been described in a previously filed patent application Ser. No. 09/477,816 previously discussed. Data or information to be transmitted 314 is line encoded using line encoder 316. An optical carrier signal is emitted from optical source 310. The carrier signal is intensity modulated by the data using optical modulator 312. (Direct modulation of the optical source is also possible, though the excess optical frequency modulation caused by the laser chirp makes direct modulation less desirable than external modulation.) The resulting signal consists of an optical carrier with double sidebands 318. When the double sideband signal 318 is sent over fiber link 320, dispersion, both chromatic and polarization mode, cause relative delays between the signal spectral components and polarization modes.

The signal to be transmitted here is s(t) which has a frequency domain representation as S(f). S(f) describes the spectral density of the signal. This signal modulates the optical carrier at frequency $f_c$ from the laser diode to generate the double side band modulated signal $[\delta(f-f_c)+S(f_c-f)+S(f_c+f)]$. The three components represent: the residual carrier itself, the lower sideband and upper sideband. The baseband signal S(f) has been upshifted to the frequency region around the carrier frequency $f_c$. The input power of the received signal is equally split into two branches (output ports) with a 3 dB splitter 322.

Each branch or output port is filtered to extract the optical carrier and a different one of the two sidebands. Applying upper sideband filter 324 results in the optical carrier and the upper sideband. Applying lower sideband filter 326 results in the optical carrier and the lower sideband. Each sideband is detected with a photodetector. Upper sideband photodetector 328 is optionally followed by upper sideband equalizer 330 and lower sideband photodetector 332 is optionally followed by lower sideband equalizer 334. Since each photodetector only detects one sideband, there is no spectral folding in either photodetector and the detected signal can be electrically compensated for dispersion (both chromatic dispersion and PMD).

The detected signals from the two branches are then combined using a diversity combiner 336 to produce the final data 338 at the receiver output. A diversity combiner is a circuit or device for combining two or more signals carrying the same information received via separate paths with the objective of providing a single resultant signal that has equal or superior quality to any of the contributing signals. The diversity combiner of the present invention can select either the better output branch or produce a weighted sum of the two equalized signals, depending on the link properties. Previous experiments (*Optical Fiber Telecommunications*, 1997, Volume IIIA, chapter 6, pages 114–161, and S. L. Woodward, et al, "PMD Mitigation via Single-Sideband Modulation and Principle-State Launch," Proceedings of 26th European Conference on Optical Communication, Vol. 2, pp 37–38, Sep. 3–7, 2000, Munich, Germany.) show that the statistical variation of PMD with respect to optical frequency can be high enough for the two sidebands to have significantly different performances. Therefore, by diversity combining the two sidebands as presented in this scheme, we can obtain a diversity gain over the improved PMD tolerance in an OSSB transmission system, at the cost of doubling the required optical bandwidth.

The criticality of this scheme lies in the sharpness of the optical filter required at the receiver, especially for a baseband OOK optical link. One possible solution is to use a fiber Bragg grating (FBG) as the filter as described by P. Yeh in *OPTICAL WAVES IN LAYERED MEDIA*, published by John Wiley & Sons, 1988. By nature, these devices are narrowband devices. They can be made with very high Q and have very sharp transition frequencies, especially if one is not trying to achieve a very wide flat band. Mechanical tuning methods such as piezoelectric stretching of the FBG can be used to align the filter with the transmitted signal sidebands. Another possibility is to use cascaded thin-film filters to achieve the sharp cut-off (also described by Yeh). Any other filters having a sharp cut-off on at least one side of the band can be equivalently substituted. Should other devices be developed that provide similar characteristics, whether or not denominated filters, they are equivalently useable and substitution can be made.

Figure 4:
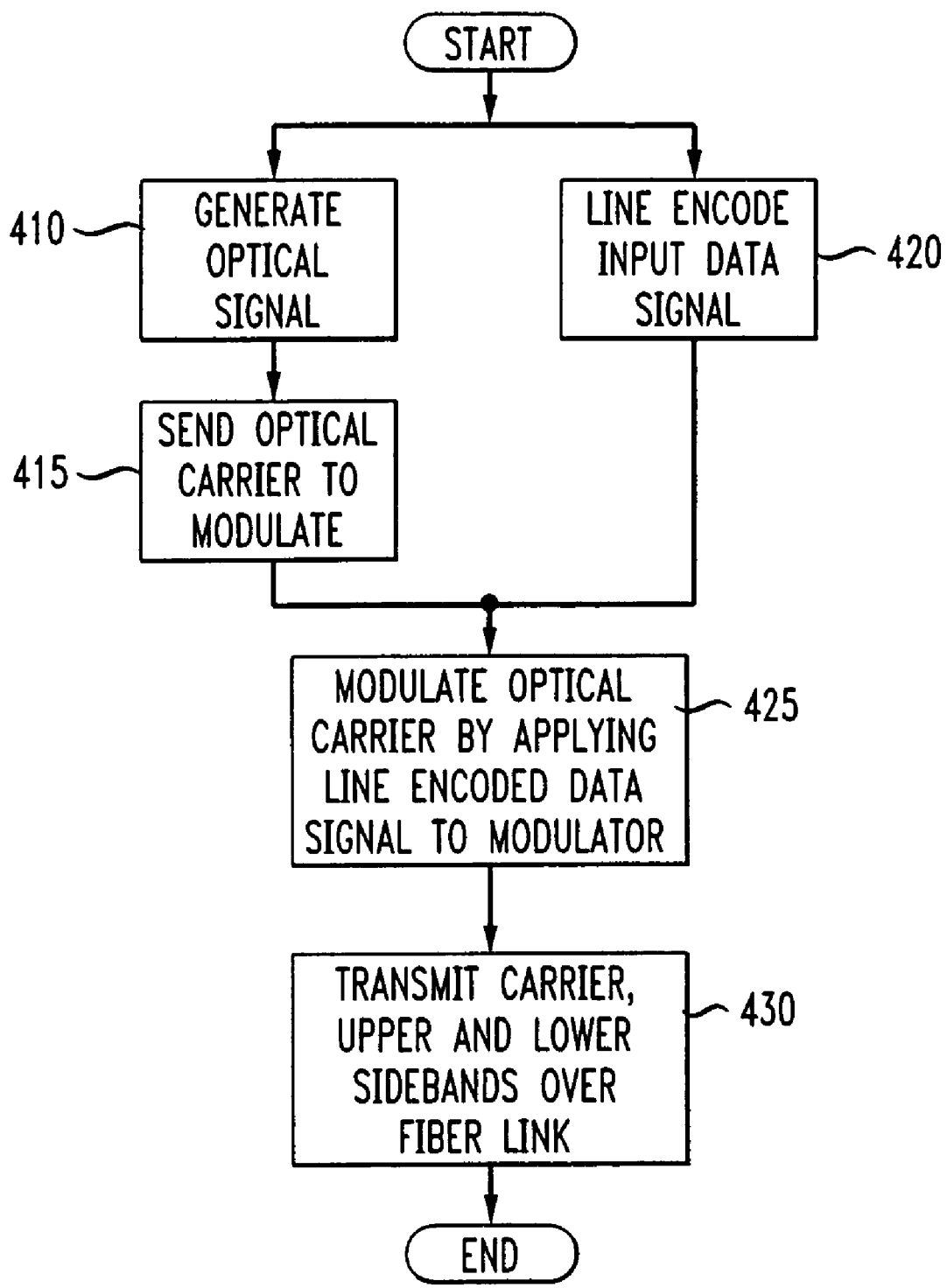
FIG. 4 is a flowchart of the transmission portion of the system.

FIG. 4 is a flowchart of the transmission portion of the system. An optical carrier is generated at step 410. This is followed by the generated optical carrier being sent to an optical modulator at step 415. Concurrently with steps 410 and 415, the input data signal is optionally line encoded at step 420. The line encoded data signal then intensity modulates the optical carrier at step 425. The intensity modulated signal (carrier and upper and lower sidebands) is transmitted over the fiber link to a receiver at step 430.

Figure 5:
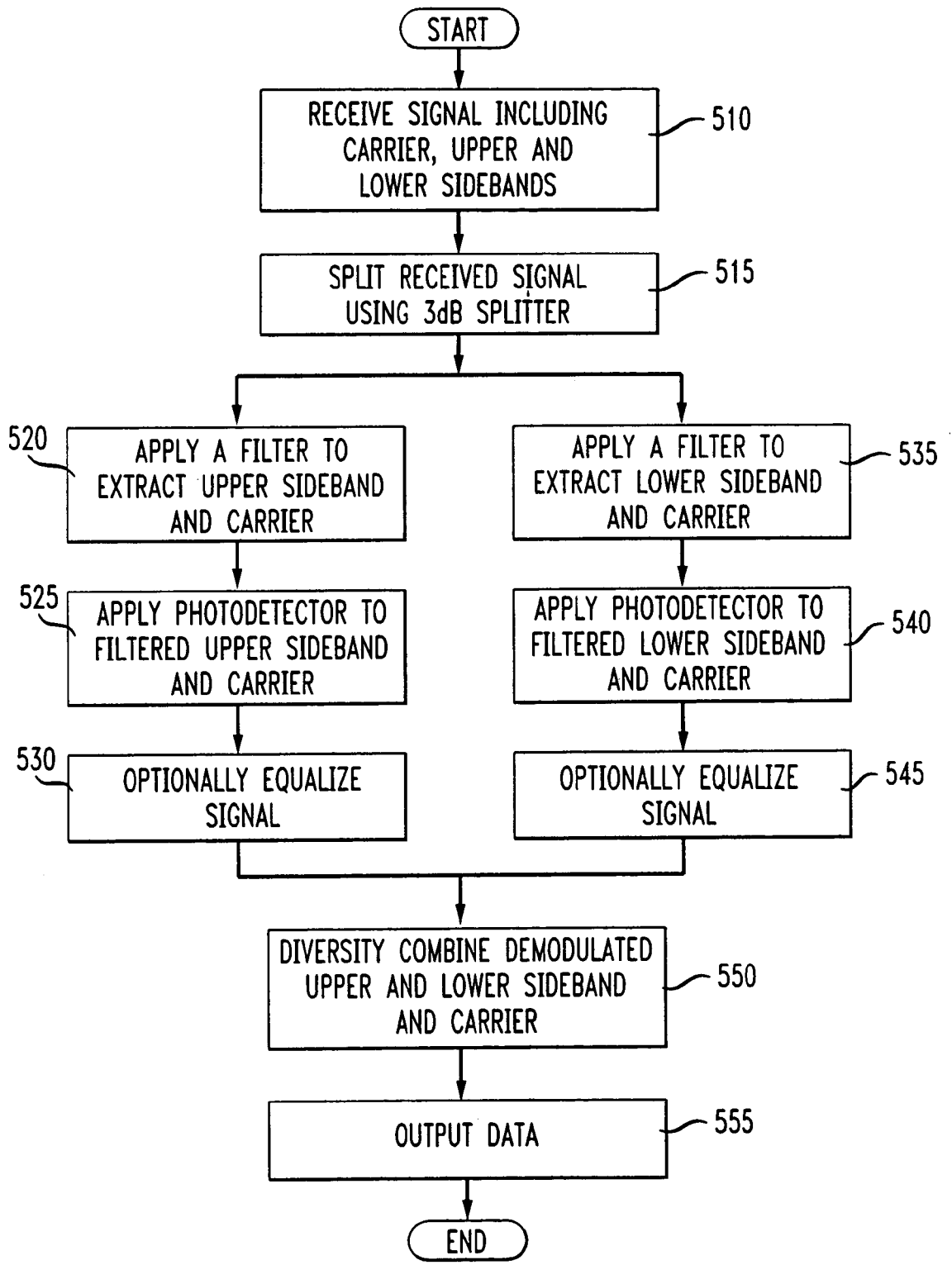
FIG. 5 is a flowchart of the receiver portion of the system.

FIG. 5 is a flowchart of the receiver portion of the system. The signal (carrier and upper and lower sidebands) is received at step 510. The received signal is split into two branches using a 3 dB splitter at step 515. One branch represents the upper sideband and the carrier and the other branch represents the lower sideband and the carrier. The two branches are processed concurrently in the preferred embodiment. Serial processing of the two branches is also possible as is processing in which some of the steps are performed concurrently. A filter is applied to each branch at steps 520 and 535. The filtered signals are then photodetected at steps 525 and 540. The photodetected signals are then optionally equalized at steps 530 and 545. The resulting signals are then diversity combined at step 550 resulting in data out at step 555.

Optical single sideband modulation has been proposed and demonstrated. However, as far as we know, nobody has proposed to detect the two transmitted optical sidebands separately, electrically compensate the two independently detected sidebands and combine the results to achieve more robust performance.

This novel and non-obvious method and system not only will improve link robustness, especially for PMD immunity, but also will allow the reuse (recycling) of legacy fiber, thus avoiding or at least postponing the need for replacement infrastructure replacement. Infrastructure replacement, besides being very costly, causes disruption to roads, buildings, etc., all of which annoys the public. Thus, the present invention provides a benefit to the public by reducing the frequency and cost of such infrastructure replacement.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications that fall within the spirit and scope of the underlying invention disclosed and claimed herein.

What is claimed is:

1. A method for receiving an optical double sideband signal over an optical fiber system, comprising the steps of:
   splitting the received optical double sideband signal into an upper sideband signal and a lower sideband signal;
   photodetecting and adaptively equalizing said upper sideband;
   photodetecting and adaptively equalizing said lower sideband;
   compensating said photodetected and adaptively equalized upper sideband signal for chromatic dispersion and polarization mode dispersion;
   compensating said photodetected and adaptively equalized lower sideband signal for chromatic dispersion and polarization mode dispersion;
   combining said dispersion compensated upper sideband signal with said dispersion compensated lower sideband signal;
   detecting a bit error rate of the resulting combined signal; and
   adjusting the adaptive equalizing according to the bit error rate.

2. The method according to claim 1, wherein said combining step is performed using a diversity combiner.

3. The method according to claim 1, wherein said optical double sideband signal is amplitude modulated.

4. The method according to claim 1, wherein said dispersion compensating step of said photodetected upper sideband and dispersion compensating step of said photodetected lower sideband is performed concurrently.

5. The method according to claim 1, wherein said photodetection step of said upper sideband and said photodetection step of said lower sideband is performed concurrently.

6. The method according to claim 1, wherein said equalization step of said photodetected upper sideband and said equalization step of said photodetected lower sideband is performed concurrently.

7. The method according to claim 1, wherein the steps of photodetecting and equalizing of said upper sideband and the steps of photodetecting and equalizing said lower sideband are performed serially.

8. The method according to claim 1, wherein a plurality of the photo detecting and equalizing steps of said upper sideband and a plurality of the photodetecting and equalizing steps of said lower sideband are performed serially.

9. The method according to claim 1, wherein a plurality of the photodetecting and equalizing steps of said upper sideband and a plurality of the photodetecting and equalizing steps of said lower sideband are performed concurrently.

10. The method according to claim 1, wherein the photodetecting, dispersion compensating and equalizing steps of said upper sideband and the photodetecting, dispersion compensating and equalizing steps of said lower sideband are performed concurrently.

11. The method according to claim 1, wherein said combining step is a summation.

12. The method according to claim 1, wherein said combining step is a weighted summation.

13. The method according to claim 1, wherein said combining step further comprises the steps of:
   delaying one sideband signal relative to the other sideband signal; and
   summing the two signals.

14. The method according to claim 1, wherein said combination step is selection of better output.

15. The method according to claim 1, wherein said combination step is based on link properties.

16. The method according to claim 1, further comprising the step of filtering the optical signal.

17. The method according to claim 16, wherein said filtering step is performed using a fiber Bragg grating (FBG).

18. The method according to claim 16, wherein said filtering step is performed using a thin-film filter.

19. A method for generating, transmitting, and receiving an optical double sideband signal, comprising the steps of:
   generating an optical carrier;
   sending said optical carrier to a modulator;
   concurrently encoding an input data signal to produce an encoded data signal;
   intensity modulating said fine encoded data signal to produce an optical double sideband signal;

transmitting said optical double sideband signal over a fiber link; splitting the received optical double sideband signal into an upper sideband signal and a lower sideband signal;

photodetecting and adaptively equalizing said upper sideband;

photodetecting and adaptively equalizing said lower sideband;

compensating said photodetected and adaptively equalized upper sideband signal for chromatic dispersion and polarization mode dispersion;

compensating said photodetected and adaptively equalized lower sideband signal for chromatic dispersion and polarization mode dispersion; and combining said dispersion compensated upper sideband signal with said dispersion compensated lower sideband signal;

detecting a bit error rate of the resulting combined signal; and adjusting the adaptive equalizing according to the bit error rate.

20. A method of receiving an optical double sideband signal, comprising the steps of:

receiving an optical double sideband signal;

splitting said received optical double sideband signal using a splitter into two branches;

concurrently processing the resulting two branches by applying a filter to each branch to produce a filtered upper sideband signal and a filtered lower sideband signal;

concurrently applying a photodetector to said filtered upper sideband signal and to said filtered lower sideband signal to produce a photodetected upper sideband signal and a photodetected lower sideband signal;

adaptively equalizing said upper sideband signal;

adaptively equalizing said lower sideband signal;

compensating said photodetected and adaptively equalized upper sideband signal for chromatic dispersion and polarization mode dispersion;

compensating said photodetected and adaptively equalized lower sideband signal for chromatic dispersion and polarization mode dispersion; and combining said dispersion compensated upper sideband signal and said dispersion compensated lower sideband signal using a combiner to produce an output signal;

detecting a bit error rate of the resulting combined signal: and adjusting the adaptive equalizing according to the bit error rate.

21. The method according to claim 20, wherein said combining step is performed using a diversity combiner.

22. The method according to claim 20, wherein said splitting step transmits an equal optical power to each branch.

23. The method according to claim 22, wherein said splitting step is performed using a 3 dB splitter.

24. A method of generating, transmitting and receiving an optical double sideband signal comprising the steps of:

generating an optical carrier;

sending said optical carrier to a modulator;

concurrently encoding an input data signal to produce an encoded data signal;

intensity modulating said line encoded data signal to produce an optical double sideband signal;

transmitting said optical double sideband signal over a fiber link;

receiving said optical double sideband signal;

splitting said received optical double sideband signal using a splitter into two branches;

concurrently processing the resulting two branches by applying a filter to each branch to produce a filtered upper sideband signal and a filtered lower sideband signal;

concurrently applying a photodetector to said filtered upper sideband signal and to said filtered lower sideband signal to produce a photodetected upper sideband signal and a photodetected lower sideband signal;

adaptively equalizing said upper sideband signal;

adaptively equalizing said lower sideband signal;

compensating said photodetected and adaptively equalized upper sideband signal for chromatic dispersion and polarization mode dispersion;

compensating said photodetected and adaptively equalized lower sideband signal for chromatic dispersion and polarization mode dispersion; and combining said dispersion compensated upper sideband signal and said dispersion compensated lower sideband signal using a combiner to produce an output signal;

detecting a bit error rate of the resulting combined signal; and adjusting the adaptive equalizing according to the bit error rate.

25. The method according to claim 24, wherein said combining step is performed using a diversity combiner.

26. The method according to claim 24, wherein said splitting step is performed using a 3 dB splitter.

* * * * *